United States Patent [19]

Blatnik

[11] 4,277,773
[45] Jul. 7, 1981

[54] LIQUID LEVEL SENSOR

[76] Inventor: Edward F. Blatnik, P.O. Box 764, Riverview, Fla. 33569

[21] Appl. No.: 663

[22] Filed: Dec. 29, 1978

Related U.S. Application Data

[63] Continuation-in-part of Ser. No. 742,777, Nov. 18, 1976, abandoned.

[51] Int. Cl.³ .................... B60Q 1/00; G08B 21/00
[52] U.S. Cl. .................................. 340/59; 340/612; 340/620; 338/13; 338/28; 116/109; 73/293; 73/304 R; 200/61.2
[58] Field of Search ............... 340/59, 604, 603, 616, 340/612, 618, 620, 52 R; 73/290 R, 293, 304 R, 307; 116/109; 338/13, 27, 28, 33, 38, 222, 231, 233; 200/61.2; 324/62, 65 R, 65 P

[56] References Cited

U.S. PATENT DOCUMENTS

| 3,179,920 | 4/1965 | McGinty | 340/59 |
| 3,312,936 | 4/1967 | Huntzinger | 340/59 |
| 3,461,447 | 8/1969 | Marouly | 340/59 |
| 3,534,352 | 10/1970 | Gallagher | 340/59 |
| 3,805,230 | 4/1974 | Sakusegawa et al. | 340/59 |
| 3,964,567 | 6/1976 | McGinty | 340/59 |
| 4,065,760 | 12/1977 | Feldon | 338/28 |

*Primary Examiner*—John W. Caldwell, Sr.
*Assistant Examiner*—Donnie L. Crosland
*Attorney, Agent, or Firm*—Stein & Frijouf

[57] ABSTRACT

An apparatus for cooperation with an existing opening within a cooling radiator of a vehicle for determining the liquid level in the radiator. The radiator, which may be an automobile or truck radiator, is connected to an electrical power source of the vehicle through the vehicle chassis. An insulator is established relative to the vehicle radiator in a substantially fixed relation. A sensor is mounted to the insulator for extending into the liquid in the radiator when a sufficient quantity of liquid is contained therein. The sensor has a plurality of curved surfaces for increasing the surface area of the sensor. An indicator interconnects the sensor with the electrical power source of the vehicle for indicating the level of liquid contained in the radiator by conductivity through the liquid in contact with the sensor. The increased surface area of the sensor enables the indicator means to be a conventional incandescent lamp connected in series with the sensor and the electrical power source of the vehicle. Also included is a first and a second sensor mounted at a first and a second vertical height within the vehicle radiator. The indicator may include a first and a second indicator connected in series with the first and second sensors respectively for indicating a cool liquid level and a hot liquid level within the radiator respectively.

9 Claims, 11 Drawing Figures

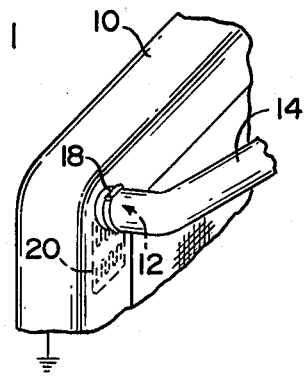
FIG.1
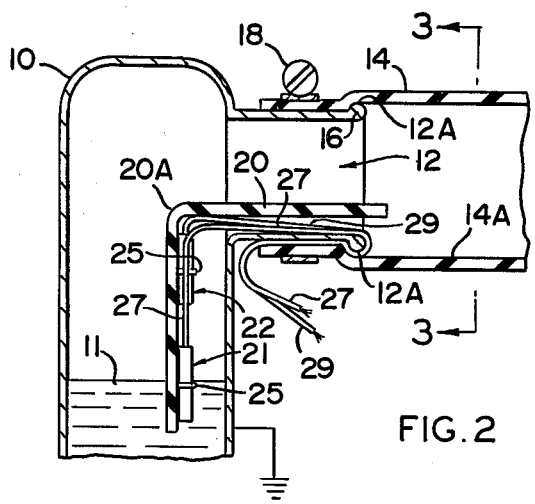
FIG.2
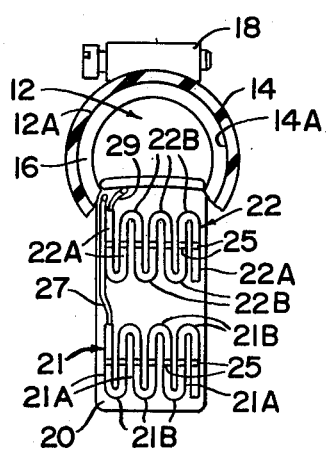
FIG.3
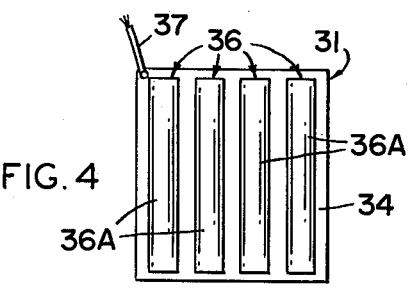
FIG.4
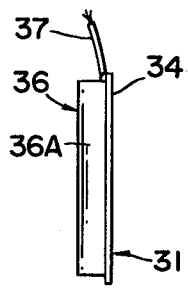
FIG.5
FIG.6
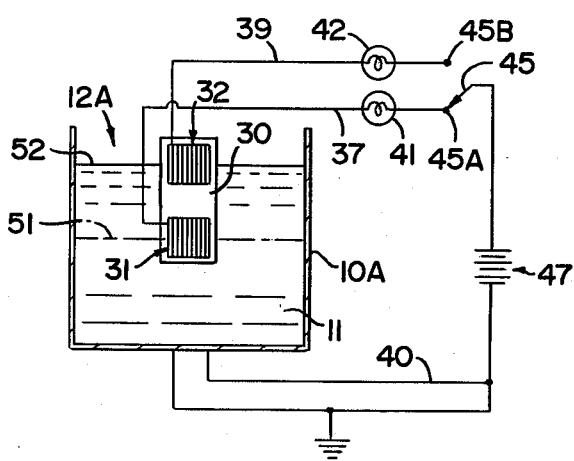
FIG.7
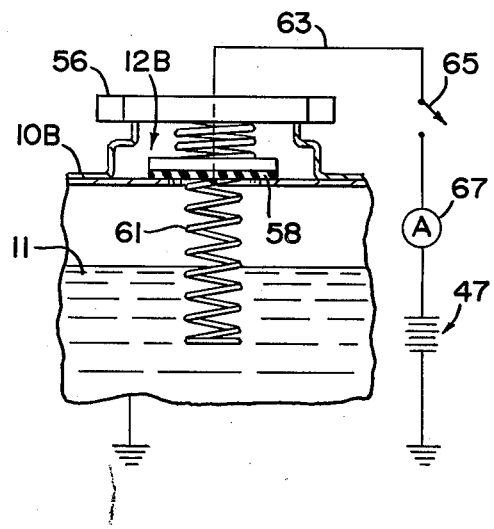
FIG.8

LIQUID LEVEL SENSOR

CROSS-REFERENCE TO RELATED APPLICATIONS

This is a continuation-in-part of my prior pending application, Ser. No. 742,777 filed Nov. 18, 1976 now abandoned.

BACKGROUND OF THE INVENTION

1. Field of the Invention

This invention relates to electrical communications and more particularly to a system which is automatically responsive to conditions of a liquid level incorporating an electrode.

2. Description of the Prior Art

The prior art has known many types of devices and apparati for determining the liquid level in a reservoir. An important aspect of these devices is the detection of the liquid level within a cooling radiator of a vehicle such as an automobile, truck or the like. Many automobiles and trucks have warning lamps or meters to indicate an excessive temperature of the cylinder head of the vehicle internal combustion engine. However, these temperature sensors are not entirely satisfactory, since in many cases they produce false readings for the operator of the vehicle. These temperature sensors only determine the temperature at a single point in the engine whereas another portion of the engine may be overheating. Damage may occur within the engine before indication by the temperature warning device.

Accordingly, the prior art has produced a variety of liquid level sensing devices for determining the liquid level in the cooling radiator of a vehicle. Many of these devices incorporated an electrical probe connected to an indicator for indicating contact of the liquid to the probe. These devices did not work satisfactorily since the amount of electrical current passing through the cooling liquid into the probe was insufficient to power many indicators such as an incandescent lamp. To overcome this problem, the prior art has complicated the system by incorporating a variety of amplifying devices connected between the probe and the indicator for amplifying the small current flowing within the cooling liquid. These circuits must be temperature compensated and are subject to failure due to extreme operating temperatures, vibrations and the like.

Another serious problem encountered with these apparati is the change in operating level within the cooling radiator when the liquid is in a cool condition or when the liquid is in a hot condition. The apparatus must be able to account for a change in temperature of the cooling liquid to determine whether an adequate amount of liquid exists for both a cool and a hot cooling liquid.

A further disadvantage of these prior art devices is that many of them require a special access hole into the internal portions of the cooling radiator to sense the liquid level therein. Many "do it yourself" consumers are reluctant to make access holes in a vehicle radiator and accordingly, these prior art devices were either installed during fabrication of the radiator or by professional personnel.

Therefore, it is an object of this invention to provide an apparatus which overcomes the aforementioned inadequacies of the prior art devices and provides an improvement which is a significant contribution to the advancement of the pertinent art.

Another object of this invention is to provide an apparatus for cooperation with an existing opening within a cooling radiator of a vehicle to determine the liquid level within the radiator.

Another object of this invention is to provide an apparatus for determining the liquid level in the radiator including sensor means extending into the liquid in the radiator when a sufficient quantity of liquid is contained therein with the sensor having a plurality of curved surfaces for increasing the surface area of the sensor means to provide a sufficient amount of current to power a conventional indicating device.

Another object of this invention is to provide an apparatus for determining the liquid level in a vehicle radiator having a first and a second sensor element mounted at a first and second vertical height within the vehicle radiator with a first and second indicator connected in series with the first and second sensor elements, respectively, and switch means interconnecting the first and second sensor means with the first and second indicators for sensing a cool liquid level and a hot liquid level within the cooling radiator.

Another object of this invention is to provide an apparatus for determining the liquid level in a vehicle radiator comprising a substantially planar conductive element and a plurality of semi-cylindrical elements affixed to the planar member for increasing the surface area of the sensor element at a given vertical height within the vehicle radiator.

Another object of this invention is to provide an apparatus for determining the liquid level in a vehicle radiator comprising insulator means affixed to the underside of a vehicle radiator filling cap and sensor means comprising a substantially spring-shaped element extending downwardly into the vehicle radiator for determining the liquid level therein.

Another object of this invention is to provide an apparatus for determining the liquid level in a vehicle radiator comprising a device for replacing a glass sight window in the side of an existing radiator.

Other objects and a fuller understanding of this invention may be had by referring to the summary of the invention, the description and the claims, taken in conjunction with the accompanying drawings.

SUMMARY OF THE INVENTION

The invention may be incorporated into an apparatus for cooperation with an existing opening within a cooling radiator of a vehicle to determine the liquid level in the radiator. The radiator is connected to an electrical power source of the vehicle through the vehicle chassis. The invention incorporates insulator means established relative to the vehicle radiator in a substantially fixed relation. Sensor means is mounted to the insulator for extending into the liquid in the radiator when a sufficient quantity of liquid is contained therein. The sensor means has a plurality of curved surfaces for increasing the surface area of the sensor means. Indicator means interconnects the sensor means with the electrical power source of the vehicle for indicating the level of the liquid contained within the radiator by conductivity through the liquid in contact with the sensor means.

The sensor means may include a first and a second sensor element mounted at a first and a second vertical height in the vehicle radiator. The indicator means may include a first and a second indicator connected in series with the first and second sensor elements, respectively. Switch means, having a first and second position, connects the first sensor element and the first indicator to the electrical power source when the switch is in the first position and connects the second sensor element and the second indicator to the electrical power source when the switch is in the second position. Accordingly, the first and second indicators indicate a cool liquid level and a hot liquid level for the cooling radiator.

The sensor means may include a conductor having a plurality of curved portions interconnected by a plurality of straight portions to provide an increased surface area at a given vertical height in the vehicle radiator. In this way a sufficient quantity of electrical current can be passed through the sensor means by the increased surface area to provide sufficient current for driving an indicator means without current amplification. The sensor means may include a substantially planar conductive element and a plurality of semi-cylindrical elements affixed to the planar element for increasing the surface area of the sensor at a given vertical height in the vehicle radiator.

In another embodiment of the invention, the insulator means may be affixed to the underside of a vehicle radiator filling cap with the sensor means comprising a substantially spring-shaped element extending downwardly into the vehicle radiator. The indicator means may include a meter movement for determining the exact liquid level in the radiator in accordance with the percentage of the sensor means immersed within the liquid of the cooling radiator. Alternatively, the indicator means may include an electro-optical indicator such as a neon or an incandescent bulb or a light emitting diode or the like. The insulator means may be located within the vehicle radiator and established therein by frictional engagement with a portion of the vehicle.

The invention may also be incorporated into an apparatus for cooperating with an existing opening within a cooling radiator of a vehicle for determining the liquid level in the radiator wherein the existing opening is a threaded aperture for receiving a transparent sight window. The sight window is removed enabling a mounting member having outer threads for threadably engaging the threaded aperture in the cooling radiator. The mounting member has an internal opening for receiving a tubular insulator. A sensor means similar to the sensors set forth above, is connected to a conductive rod which extends through the tubular insulating means for contact in series with the electro-optical indicator means.

This invention accordingly comprises an apparatus possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of this invention, reference should be had to the following detailed description taken in connection with the accompanying drawings in which:

FIG. 1 is an elevational perspective view of a vehicle radiator receiving sensor means of the instant invention;

FIG. 2 is a side view, partially in section, of the sensor means shown installed in the vehicle radiator;

FIG. 3 is a view along line 3—3 of the sensor means shown in FIG. 2;

FIG. 4 is a front elevational view of a second embodiment of a sensor element compatible for use in the instant invention;

FIG. 5 is a side view of the sensor element shown in FIG. 4;

FIG. 6 is a end view of the sensor element shown in FIG. 4;

FIG. 7 is a schematic diagram of the invention installed within a reservoir including associated electrical components;

FIG. 8 is a schematic view of a third embodiment of the invention;

Similar reference characters refer to similar parts throughout the several views of the drawings.

DETAILED DESCRIPTION

Figure 9:
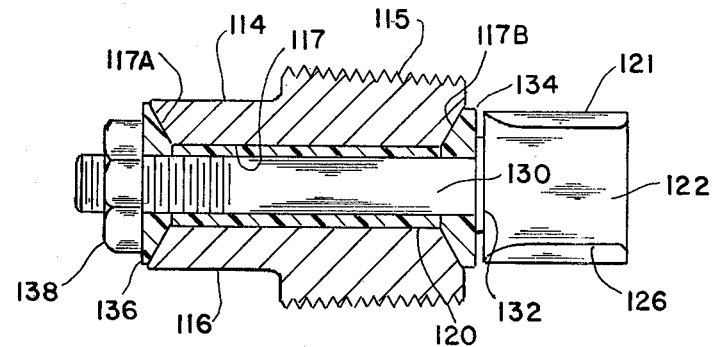
FIG. 9 is a sectional view along line 9—9 in FIG. 10 showing a fourth embodiment of the invention.

FIG. 1 is an elevational view of a portion of the invention cooperating with an existing opening 12 of a cooling radiator 10 of a vehicle (not shown) which may be an automobile, truck or the like. FIGS. 2 and 3 show in greater detail the portion of the invention cooperating with the existing opening in the radiator 10 shown as a port 12 for communication with a hose 14 which extends to the water jacket of an internal combustion engine (not shown). The hose 14 is secured relative to port 12 through a lip 16 and a hose clamp 18 as is well known in the art. The invention includes insulator means 20 which may be a rigid material such as bakelite or the like or a flexible material such as hard rubber. The insulator 20 is established relative to the vehicle radiator 10 in a substantially fixed relation as shown, by friction and by contact to the edge of port 12. The apparatus includes sensor means, shown in this embodiment as a first and a second sensor element 21 and 22, secured to insulating means 20 by a plurality of staple-like clamps 25. The first and second sensor elements are mounted at a first and a second vertical height within the vehicle radiator 10 as shown. The first and second sensor elements 21 and 22 are connected through connectors 27 and 29 respectively which are fed between the outside surface 12A of port 12 and the inside surface 14A of hose 14 to provide electrical communication from the outside or radiator 10 to the internal sensors 21 and 22 within radiator 10.

Each of the first and second sensor elements 21 and 22 has a plurality of straight portions 21A and 22A and a plurality of curved portions 21B and 22B, respectively. The curved 21B, 22B and straight 21A, 22A portions enable an increase in surface area of the conductive sensing element at a given vertical height. Consequently, there is sufficient surface area of contact between a sufficient quantity of radiator liquid 11 and the sensor elements 21 and 22 to provide sufficient current flow through the liquid 11 and connectors 27 and 29 for energizing indicator means without current amplification.

The insulating means 20, shown in FIGS. 1-2, being a flexible material may be substantially straightened at bend 20A to be inserted within a relatively small port 12 in a deformed condition. Subsequently the insulator 20 regains the original shape having the substantial bend 20A. This properly enables insertion of the sensor elements 21 and 22 inside the radiator 10 without special tools or without the need of providing additional access holes. The fastening of connectors 27 and 29 between the outside surface 12A of port 12 and the inside surface 14A of hose 14 aids in establishing the insulator means 20 relative to the radiator 10.

Each of the first and second sensor elements 21 and 22 may be heavy copper wire fastened as shown to increase the surface area thereof. Many prior art references show a single electrode projecting downwardly into the liquid of the radiator. Unfortunately, such a configuration does not pass sufficient current to activate an indicator without current amplification. Accordingly, the construction of the electrodes shown in FIGS. 2 and 3 enables a useful current to be generated by a simple electrode circuit.

FIGS. 4-6 illustrate a second embodiment of a first sensor element 31 suitable for use on insulator means 30 shown in FIG. 7. The second sensing element 32 in FIG. 7 is substantially identical to the first sensor element 31. The sensor element 31 includes a planar surface 34 having a plurality of semi-cylindrical elements 36 secured to the planar surface 34 for increasing the surface area of the sensor at a given vertical height in the vehicle radiator. The incorporation of the semi-cylindrical element provides surfaces 36A and 36B to increase the surface area.

FIG. 7 illustrates the complete diagram of the invention for cooperating with an existing opening 12A of a cooling radiator of a vehicle shown symbolically as 10A connected to an electrical ground by a vehicle chassis 40. The first and second sensor elements 31 and 32 are connected by connectors 37 and 39 to first and second indicators 41 and 42 shown as incandescent bulbs. A switch 45 has a first and second position 45A and 45B for connecting an electrical power source 47 of the vehicle to the first and second indicators 41 and 42 and sensor elements 31 and 32.

Assuming the line 51 indicates the proper liquid level for a cool liquid in the radiator 10A, then the operator will place switch 45 in the first position 45A and the first indicator 41 will be illuminated due to the contact of the liquid 11 with the first sensor 31. The proper liquid level for heated liquid may be represented by level 52. As the liquid 11 is heated to a normal operating temperature, then placing switch 45 in the second position 45B will provide illumination to the second indicator 42 when a proper level of hot liquid is present within the radiator 10A.

FIG. 8 shows a third embodiment of the invention showing a radiator 10B having a filler opening 12B with a filler cap 56 secured to the port 12B as is well known in the art. The filler cap includes an insulator 58 for receiving a sensor 61 shown as a spring-shaped member extending downwardly into the liquid 11 and connected through connector 63 and switch 65 to an ammeter 67 and the power source 47 of the vehicle. In this embodiment, the current flow through ammeter 67 is proportional to the amount of surface area of sensor 61 contacting the liquid 11. Accordingly calibration of ammeter 67 can accurately indicate the level of liquid 11 within the radiator 10B.

Figure 10:
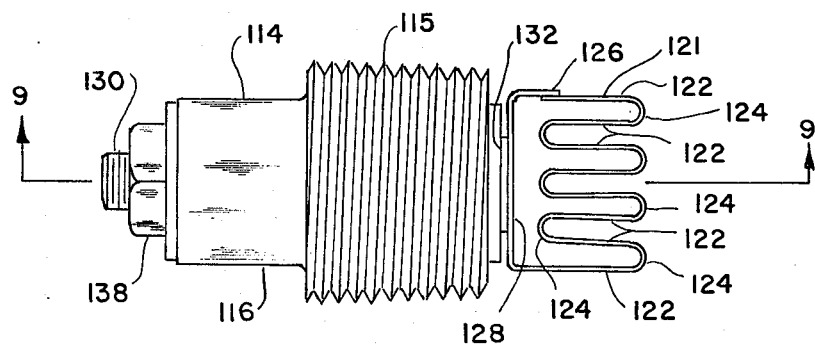
FIG. 10 is an elevational view of the device shown in FIG. 9.
Figure 11:
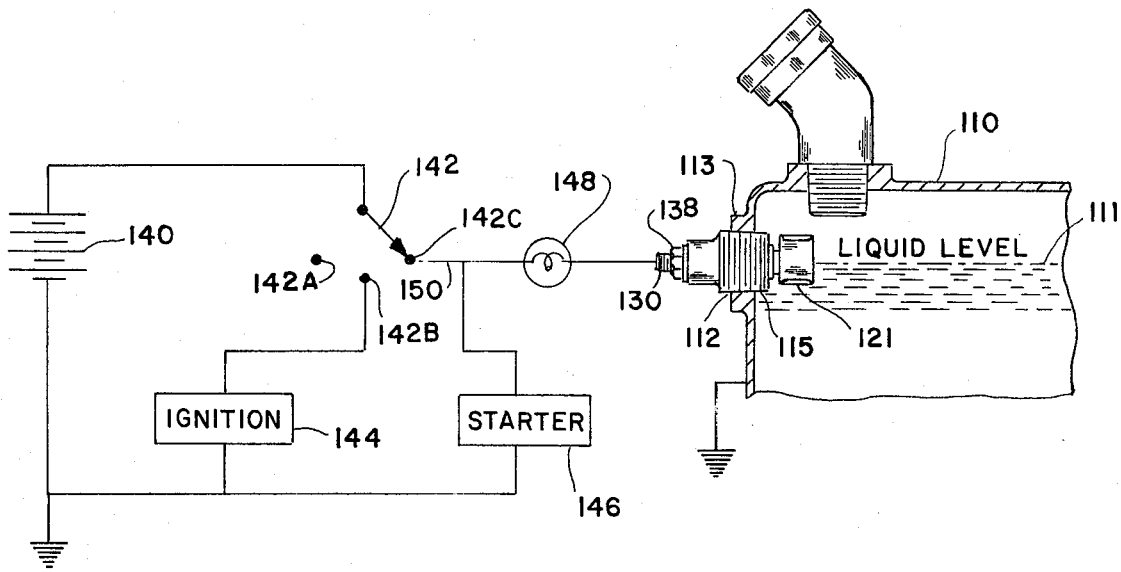
FIG. 11 is a diagram illustrating the device shown in FIGS. 9 and 10 mounted within a vehicle radiator and interconnected to the electrical system thereof.

FIGS. 9-11 illustrate a fourth embodiment of the invention for cooperation with a radiator 110 for determining the liquid level 111 therein. The radiator 110 includes a threaded aperture 112 disposed in a boss 113 of the radiator 110. The radiator 110 is illustrated as a truck radiator wherein a sight window (not shown) is threaded into the threaded aperture 112 for viewing the water level internal the radiator 110. The invention comprises a mounting member 114 having threads 115 extending about a substantially cylindrical portion of the mounting member. A square portion 116 of the mounting member 114 enables the device to be tightened with a wrench as in FIG. 11. The mounting member 114 includes a central aperture 117 having recesses 117A and 117B tapering inwardly toward the aperture 117.

The central aperture 117 receives a tubular insulator 120 for supporting a sensor means 121. The sensor means 121 is formed from a single metallic plate having a plurality of substantially parallel plate portions 122 separated by a plurality of substantially semi-cylindrical portions 124. The ends of the single metallic plate are joined at 126 by suitable means such as soldering, welding or the like. The sensor means 121 operates in a substantially identical manner as set forth for the sensor means in FIGS. 1-8.

A sensor rear plate 128 is secured to a conductive rod 130 shown as a threaded rod having a head 132 secured to the rear plate 128 by means such as soldering or the like. The conductive rod 130 engages the internal bore of tubular insulator 120 to fix the sensor 121 relative to the radiator 110. An inner insulator 134 is tapered to conform to the taper 117B of mounting member 117 whereas an outer insulator 136 is similarly tapered to cooperate with the taper 117A. A nut 138 compresses the inner and outer insulators 134 and 136 to secure the device into a unit as shown in FIGS. 9 and 10. The outer plate members 122 in FIG. 10 include recesses in the top and bottom thereof for slightly rounding the corners of the substantially square sensor means 121 to facilitate entry into a circular aperture.

FIG. 11 illustrates the invention shown in FIGS. 9 and 10 secured into the vehicle radiator 110. A battery 140 is connected through an ignition switch 142 for energizing the ignition circuit shown as 144 through a contact 142B or the starter circuit 146 through a contact 142C. The electro-optical device 148 is connected through contact 142C of ignition switch 142 to the positive terminal of battery 140. The negative terminal of battery 140 and the vehicle radiator 110 are connected to chassis ground. Accordingly, upon applying starter power to the vehicle, the electro-optical indicator 148 will be illuminated if sensor 121 is in contact with the cooling fluid level in the radiator 110. In this embodiment, the electro-optical indicator 148 will only be illuminated during the starting process. The electrical connector 150 may, in the alternative, be connected to terminal 142B to illuminate electro-optical device 148 during operation of the vehicle. It should be appreciated that in either embodiment, the current flowing through electro-optical indicator 148 is carried exclusively by the current flow through the fluid within radiator 110 contacting sensor 121.

The present disclosure includes that contained in the appended claims, as well as that of the foregoing description. Although this invention has been described in the preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:
What is claimed is:

1. An apparatus for cooperation with an existing opening within a cooling radiator of a vehicle to determine the liquid level in the radiator, the radiator being connected to an electrical power source of the vehicle, comprising in combination:
   insulator means established relative to the vehicle radiator in a substantially fixed relation;
   sensor means mounted to said insulator means for extending into the liquid in the radiator when a sufficient quantity of liquid is contained therein;
   said sensor means including a conductor having a plurality of curved portions interconnected by a plurality of linear portions;
   said plurality of linear portions of said sensor means each extending parallel to the surface level of the liquid with substantially identical surface area regions of each of said plurality of linear portions being immersed in the liquid for a given liquid level;
   said plurality of curved portions and said plurality of linear portions increasing the surface area of said sensor means to provide increased electrical contact with the liquid in the cooling radiator; and
   an electro-optical indicator means interconnecting in series with said sensor means and the electrical power source of the vehicle for indicating the level of the liquid contained in the radiator by illuminating said electro-optical indicator means exclusively by the electrical conductivity through the liquid in contact with said sensor means.

2. An apparatus as set forth in claim 1, wherein said sensor means comprises a plurality of substantially parallel planar members interconnected by a plurality of semicylindrical elements for increasing the surface area of said sensor means at the given vertical height in said vehicle radiator.

3. An apparatus as set forth in claim 2, wherein said plurality of parallel planar members and said plurality of semi-cylindrical elements comprise a single conductive metallic member.

4. An apparatus as set forth in claim 2, including a mounting member for engaging the existing opening within the cooling radiator; and
   said insulator means secured relative to said mounting member for receiving said sensor means.

5. An apparatus as set forth in claim 4, wherein said insulator means extends along an internal opening in said mounting member.

6. An apparatus as set forth in claim 5, wherein said insulator means comprises a tubular insulator with the outer surface of said tubular insulator engaging said mounting member and with said tubular insulator receiving therein an electrical conductor connected to said sensor means.

7. An apparatus as set forth in claim 6, wherein said mounting member comprises threads for engaging threads in the existing opening within the cooling radiator.

8. An apparatus as set forth in claim 7, wherein the cooling radiator is connected to electrical ground of the vehicle; and
   said sensor means connected through an ignition switch of the vehicle to operate the apparatus only upon operation of the vehicle.

9. An apparatus for cooperation with an existing opening within a cooling radiator of a vehicle to determine the liquid level in the radiator, the existing opening being a threaded aperture for receiving a transparent sight window and with the radiator being connected to an electrical power source of the vehicle, comprising in combination:
   a mounting member having outer threads for threadably engaging the threaded aperture of the cooling radiator;
   said mounting member having an internal opening for receiving a tubular insulator means;
   sensor means mounted to said insulator means for extending into the liquid in the radiator when a sufficient quantity of liquid is contained therein;
   said sensor means including a conductor having a plurality of curved portions interconnected by a plurality of linear portions;
   said plurality of linear portions of said sensor means each extending parallel to the surface level of the liquid with substantially identical surface area regions of each of said plurality of linear portions being immersed in the liquid for a given liquid level;
   said plurality of curved portions and said plurality of linear portions increasing the surface area of said sensor means to provide increased electrical contact with the liquid in the cooling radiator;
   a conductive rod extending through said tubular insulator means connected to said sensor means; and
   an electro-optical indicator means interconnecting in series with said conductive rod and the electrical power source of the vehicle for indicating the level of the liquid contained in the radiator by illuminating said electro-optical indicator means exclusively by the electrical conductivity through the liquid in contact with said sensor means.

* * * * *